PROTECTION CIRCUIT FOR POWER TRANSISTOR

Filed Feb. 2, 1968

INVENTORS
CLAUDE C. ROUTH
KEITH E. GEREN
BY
ATTORNEYS 3,522,480
Patented Aug. 4, 1970

3,522,480

PROTECTION CIRCUIT FOR POWER TRANSISTOR

Claude C. Routh and Keith E. Geren, San Diego, Calif., assignors to the United States of America as represented by the Secretary of the Navy Filed Feb. 2, 1968, Ser. No. 702,688
Int. Cl. H02h 3/18
U.S. Cl. 317—20 3 Claims

ABSTRACT OF THE DISCLOSURE

To prevent reverse bias of the emitter-base junction of a power transistor with a reactive load, a diode clamp is connected between the emitter and the base. A current protective circuit is also incorporated.

The invention described herein may be manufactured and used for or by the Government of the United States of America for governmental purposes without the payment of any royalties thereon or therefor.

BACKGROUND

It is relatively simple to protect an amplifier from damage caused by an excessive driving signal or an excessive load. Feedback or feed forward, with short time constant, from the abnormal voltage point to the control circuits of the amplifier is usually sufficient. Such protective circuits, however, will not necessarily save the transistor from burn out or "secondary breakdown," as termed by the trade, when a reactive load is coupled to the transistor. Burn-out usually occurs when a back-biased base-emitter junction at the time of a heavy inductive load. The transistor might ordinarily withstand this load if forward biased. If heavy current is drawn during saturation the inductance tends to keep the current flowing after signal voltage cross over whereupon the back-bias condition is established and the heavy current causes excessive heat. This reverse bias can happen during each half cycle, particularly in a class B type output amplifier stage, where the current signal wave may lag the voltage signal wave. A capacitive load would also cause a leading current and burn-out trouble.

Accordingly, the object of this invention is to provide an improved transistor protective circuit.

A more specific object of this invention is to provide an improved protective circuit for a power transistor which may be required to drive a heavy, reactive load such as an underwater sound transducer.

Other objects and features of this invention will become apparent to those skilled in the art by referring to a specific embodiment described in the following specification and shown in the accompanying drawing in which.

SUMMARY

Where the power transistor must be connected to a reactive load, there results considerable reactance in the output circuit of the transistor and the power factor of the signal energy is poor. Where the reactance is inductive as in the case of sonar transducers and their matching networks or transformers, the signal current wave may lag considerably the signal voltage wave. This means that there may be a peak current flow through the emitter-collector circuit of the transistor after the base has passed through its voltage peak, whereupon there is an unfortunate reverse bias at the base-emitter junction via the emitter resistor and for some reason, not presently understood, current flowing at this instant can destroy the transistor at lower levels than at the normal forward bias situation. An emitter resistor of low ohmic value is connected to the emitter and a diode is connected from the emitter terminal to the signal source, and hence to the base, so that a forward bias sets up forward direct current through the base-emitter junction as well as through the diode. If now the normal emitter-to-base voltage tends to reverse, the diode is back biased, becomes a high impedance, and permits the signal voltage at the base to keep "ahead" of the emitter. As a result, the base-to-emitter bias never reverses.

Figure 1:
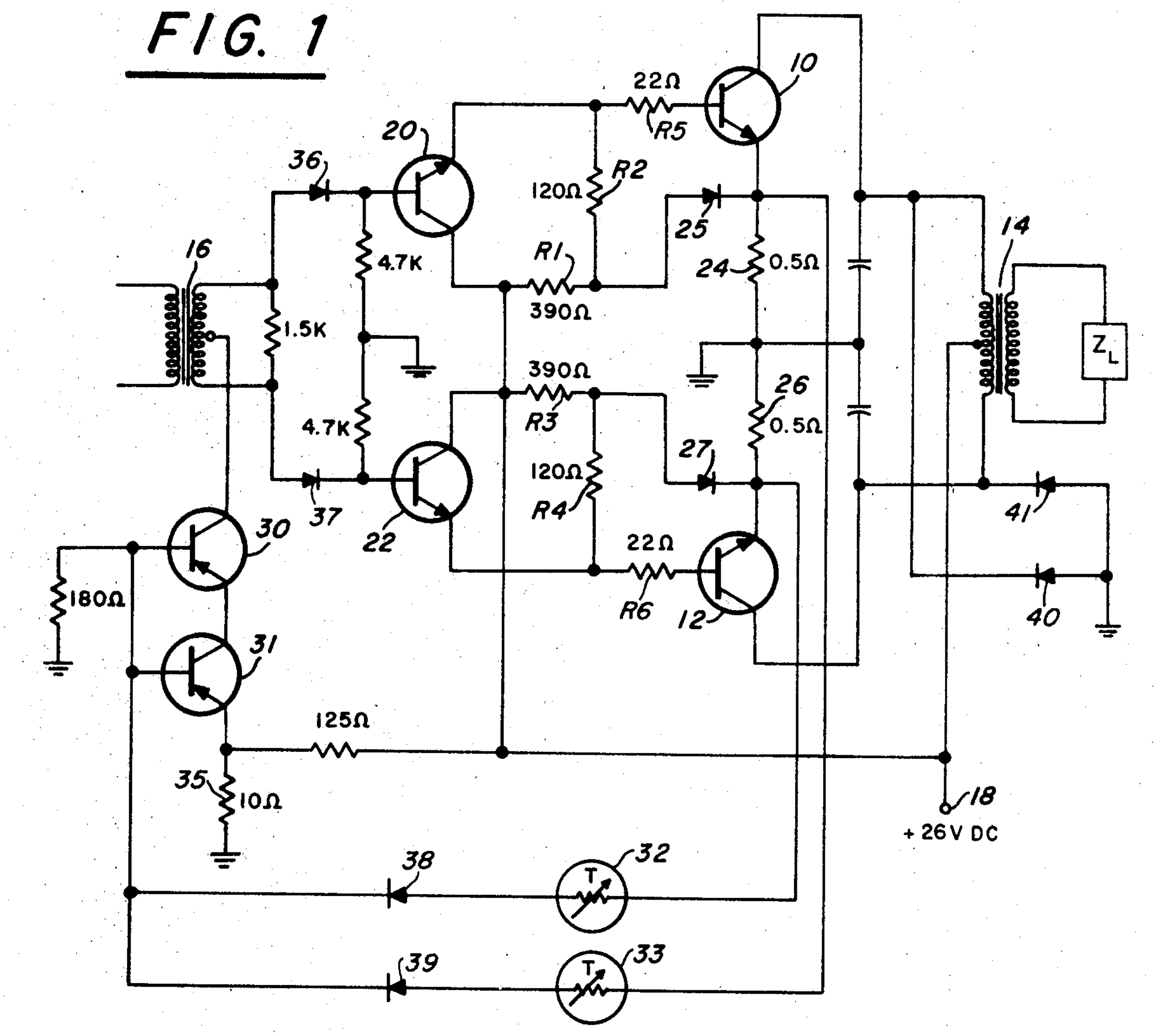
FIG. 1 is a circuit schematic diagram of said one embodiment.

In FIG. 1 the power transistor to be protected is shown at 10 and is coupled at its output to transformer 14 and is coupled at its input to signal input transformer 16. Because of the advantages of the symmetry of a push-pull circuit, the second transistor 12 is shown. As usual, the primary of the output transformer is center tapped and the secondary winding of the input transformer is center tapped and the primary power is derived from the direct current source appearing at terminal 18. It will be assured that terminal 18 is positively polarized and that there are suitable reference grounds throughout the circuit.

At 20 and 22 are, respectively, the driver amplifiers for the power amplifiers 10 and 12. While there are many circuit configurations for coupling the signal of one amplifier into the next, it is preferred that the coupling circuits of amplifier 20 be of the emitter follower type. Then, the emitter circuit of the driver can be connected directly in series with the base-emitter circuit of the power amplifier 10. The emitter resistor for 10 also acts as part of the emitter follower load. The collectors of drivers 20 and 22 are connected in multiple to the positive power source 18. According to an important feature of this invention, both emitter resistors 24 and 26 are connected between the emitters of the power amplifiers and ground.

Let it be assumed now that the output transistors 10 and 12 and the driver transistors 20 and 22 operate class B. Transistors 30 and 31 are connected in series and are used for automatic signal level control and are normally saturated to provide a low impedance ground return for signals at the center tap of transformer 16 and to couple forward bias from the voltage drop across emitter resistor 35 through the diodes 36 and 37 and to the bases of the driver transistors 20 and 22. Diodes 36 and 37 permit transistors 20 and 22 to be driven in the forward direction by signals from push-pull transformer 16 only as long as the signal ground is completed through control transistors 30 and 31. In the absence of this ground return, either diode 36 or diode 37 will always be inversely biased. This will prevent either transistor 20 or 22 from being driven by signals from push-pull transformer 16. Now, current limiting resistors R1 and R3, respectively in series, with diodes 25 and 27 provide reference forward bias voltages for the bases of transistors 10 and 12 during the part of the signal cycle that their respective drivers 20 or 22 are cut off. This reference bias is coupled from the junction of R1 and diode 25 through resistors R2 and R5 to the base of transistor 10 and from the junction of R3 and diode 27 through R4 and R6 to the base of transistor 12. This unique circuit arrangement provides high protection against both forward-bias second breakdown, or breakdown at an edge of the transistor junction, as well as inverse-bias second breakdown or breakdown in a central area of the transistor junction. Resistors R5 and R6 serve as current limiting resistors coupling from the low impedance emitter follower type drivers to the bases of the output transistors. This reduces the vulnerability to forward-bias second breakdown. During the portion of the signal cycle that the output transistors 10 or 12 are not driven, the forward reference bias previously mentioned provides reduced vulnerability to inverse-bias second breakdown. Fortunately, the resistance in the base-to-emitter circuit increases during the not driven period, which further reduces inverse-bias second breakdown by providing more suitable current limiting to the surge voltage that results from the stored energy of a reactive load on the "turn-off delay" of the transistor 10 or 12.

Figure 2:
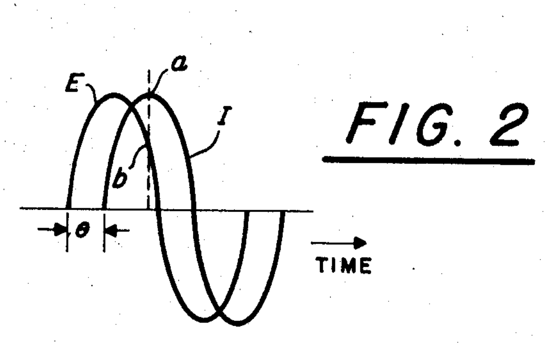
FIG. 2 shows a signal voltage wave and signal current wave of the type encountered in the circuit of FIG. 1 at the base and emitter, respectively, of transistor 10 or 12 in FIG. 1.

Let it be assumed that at a predetermined signal frequency and with relatively high inductive load connected to the transformer windings 14, the signal current I lags the signal voltages E by the phase angle $\theta$, as shown in FIG. 2. The circuit for such a lagging current includes the collector-emitter path of amplifier 10 and the emitter resistor 24. This means that when the IR drop across resistor 24 has produced a peak voltage due to lagging load current and corresponding to point *a* on the current wave of FIG. 2, the base signal voltage at the same instant occurs at the point *b*, and at some relatively low value. The resulting reverse bias at the base-emitter of amplifier 10 makes the amplifier particularly vulnerable to burn out.

But, according to this invention, if the emitter ever tries to go positive with respect to the base, the diode 25, functioning as a clamp, becomes back biased and becomes a high impedance and the voltage at the junction of divider resistors R1–R2 is freed to rise, bringing the base voltage with it. Since the diode reaction to condition of lagging current can be much faster than the period at power frequencies, the base emitter circuit of power amplifier 10 never becomes reversed.

An inductive load at transformer 14 with a phase angle of 60° operating at 80 kilocycles per second was driven to full rated output power with no breakdown of the power transistors. Power transistors driving the same load at the same levels but without the clamping diodes 25 or 27, invariably burned out.

In certain uses it is desirable to limit the amplitude of the output current signal below a certain ceiling value, and the ceiling should be dependent on transistor temperature so as to vary current according to the manufacturer's derating specifications. The voltage across resistor 24 is directly related to the emitter current of transistor 10 at any given instant and the voltage across resistor 26 is directly related to the emitter current of transistor 12 at any given instant. These voltages are used to control the previously mentioned automatic control transistors 30 and 31 to provide an automatic current limit for the power output transistors 10 and 12. The voltage at the emitter of transistor 10 is coupled through thermistor 32 and diode 38 to the bases of transistors 30 and 31 along with another identical circuit coupled from the emitter of transistor 12. Thermistor 32 is mounted on a heat sink common to transistor 10. Thermistor 33 is mounted on a heat sink common to transistor 12. Diodes 38 and 39 prevent interaction between the emitter circuits of transistor 10 and 12. Circuit values for transistors 30 and 31 are selected to provide a suitable threshold level for current limiting. As the temperature of transistor 10 and/or 12 increases, the resistance of its companion thermistor 32 and/or 33 decreases. This decreases the threshold level for current limiting to provide an automatic current limit suitable and safe for this operating temperature. Under normal operating conditions the current limiting circuit does nothing. If the input signal is steadily increased the output will steadily increase until the current limit is reached. At this point the current becomes sharply limited. Further increases in output will result in further flattening of the output waveform until ultimately the output will be a square wave without regard to the input waveform. In the event that the output load should become shorted while the amplifier is being driven with signal, the emitter of the output transistors will immediately become maximum. If this condition is permitted to continue, the transistors will heat the heat sinks and the thermistors which will steadily reduce the current limit level until an equilibrium temperature is reached. With proper selection of circuit values, this temperature will be below the destruction point of the transistors.

Transient voltage protection is provided by diodes 40 and 41. Diode 40 is connected from the collector of transistor 10 to ground and diode 41 is connected from the collector of transistor 12 to ground. These diodes are inversely biased by the collector supply voltage. In the event of an open circuit load (or a high impedance reactive load) and a high level input pulse, it is possible to develop a high transient voltage across transformer 14. In this event the collector of either transistor 10 or transistor 12 would be driven inversely, and either diode 40 or diode 41 would be subjected to forward voltage and will conduct.This sharply limits the voltage in the inverse direction and because transformer 14 has low leakage inductance the forward voltage transient on the other output transistor is limited to a value somewhat higher than twice the collector supply voltage.

In one specific embodiment, the power transistors 10 and 12 were of the commercial type 2N3055 valued, currently, over $100 each. With the drivers of the 2N2994 type, the resistance and circuit parameters were selected with the values indicated in FIG. 1. Wide variations of transistor types and circuit parameters could of course be adapted without departing from the scope of the appended claims.

What is claimed is:

1. In a transistor protection system,
a driving transistor, a power transistor, and a reactive load coupled in cascade,
an emitter-resistor connected to the emitter of said power transistor,
the emitter electrode of said driving transistor being connected directly to the base electrode of said power transistor,
the collector electrode of said driving transistor being connected to the emitter electrode of said power transistor through a series resistance and diode,
the junction of said series resistance and diode being coupled to said base electrode of said power transistor,
said diode being so polarized that forward current through said diode adds to the base-emitter current in said emitter resistor, and
the resistance values of said series resistance and diode being so proportioned that the voltage at said junction with respect to the voltage at the emitter-end of said emitter is such that abnormal IR voltage drop across said emitter-resistor can reverse bias said diode and unclamp the base of said power transistor.

2. In an amplifier system,
a power transistor, a reactive load connected to the output collector-emitter electrodes of said transistor,
a resistor connected directly to and in series with said emitter,
a signal source,
a first circuit from said source to the base of said transistor,
a second circuit from said source to said emitter, said second circuit containing a series diode, and
said diode being polarized to normally forwardly conduct toward said resistor and clamp said base to said emitter and to unclamp said base when the emitter voltage tends to exceed the base voltage,
a feedback circuit connected from the emitter-end of said resistor to said signal source for limiting the current amplitude of the output signal to a level below a predetermined ceiling, and
means for varying said ceiling in response to the temperature of said power transistor so as to remain within predetermined current limits with respect to temperature.

3. In an amplifier system, a power transistor, a reactive load connected to the output collector-emitter electrodes of said transistor, a resistor connected directly to and in series with said emitter, a signal source, a first circuit from said source to the base of said transistor, a second circuit from said source to said emitter, said second circuit containing a series diode, and said diode being polarized to normally forwardly conduct toward said resistor and clamp said base to said emitter and to unclamp said base when the emitter voltage tends to exceed the base voltage, two of said power transistors, said power transistors being coupled in push-pull, being biased for class B operation, and each having an emitter resistor, said signal source comprising two driving transistors, each driving transistor being coupled, respectively, to one of said power transistors, a center tapped signal transformer coupled in push-pull fashion to the inputs of said driving transistors, a control transistor with a controlled circuit connected between the electrical center of said transformer and references ground, said controlled circuit being normally saturated, two temperature responsive resistance elements connected between the control electrode of said control transistor and, respectively, the emitter-ends of said emitter resistors.

References Cited

UNITED STATES PATENTS

| | | | |
|---|---|---|---|
| 3,303,387 | 2/1967 | Springer | 317—33 X |
| 3,304,489 | 2/1967 | Brolin et al. | 317—33 X |
| 3,335,361 | 8/1967 | Natale et al. | 317—33 X |
| 3,441,747 | 4/1969 | Van Dine | 307—237 X |

JAMES D. TRAMMELL, Primary Examiner

U.S. Cl. X.R.

307—237; 317—33, 41, 43